March 26, 1968     T. BUDZICH     3,374,847
TRACTOR DRIVING EFFORT RESPONSIVE TO PULLED LOAD
Filed Oct. 21, 1965     2 Sheets-Sheet 1

INVENTOR
TADEUSZ BUDZICH
By William N. Hogg
Attorney

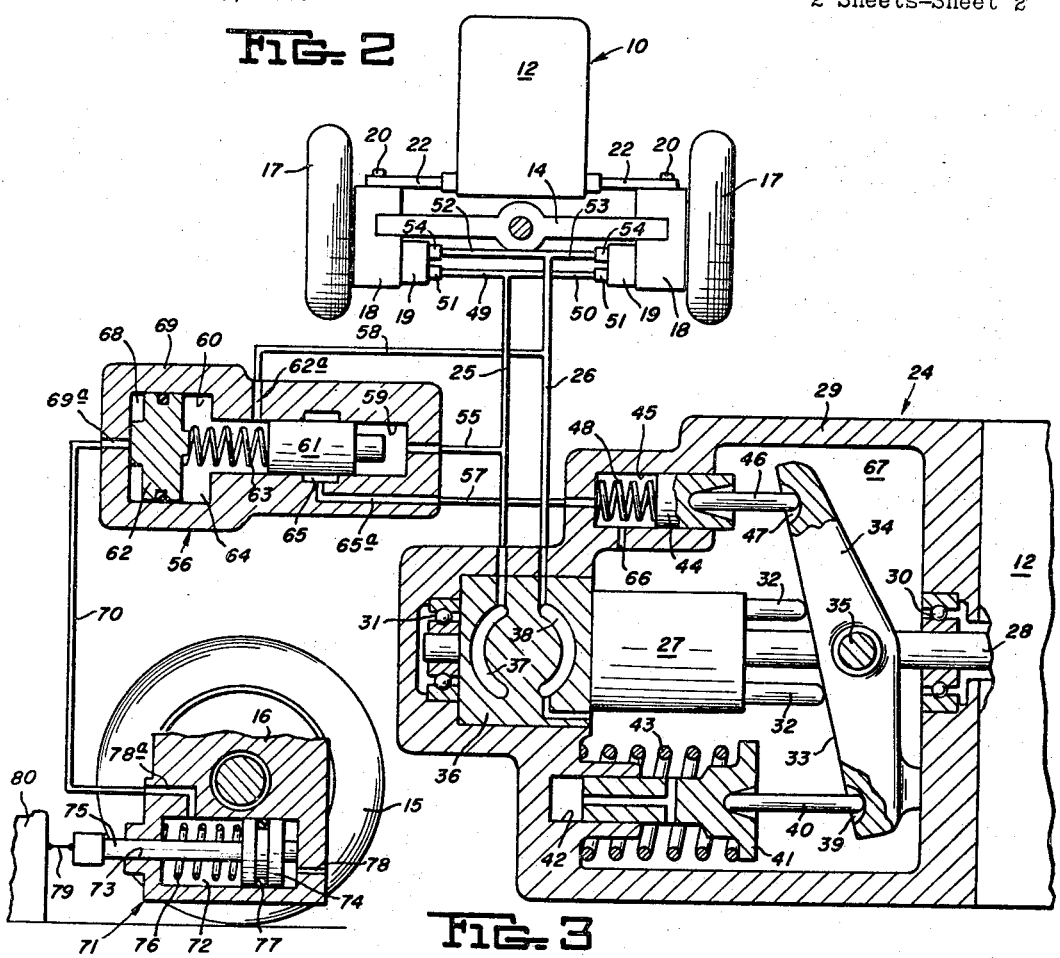

United States Patent Office 3,374,847
Patented Mar. 26, 1968

3,374,847
TRACTOR DRIVING EFFORT RESPONSIVE TO PULLED LOAD
Tadeusz Budzich, 80 Murwood Drive,
Moreland Hills, Ohio
Filed Oct. 21, 1965, Ser. No. 509,672
27 Claims. (Cl. 180—14)

ABSTRACT OF THE DISCLOSURE

An auxiliary hydrostatic transmission for a farm tractor which employs a variable fluid pump adapted to drive fluid motors mounted on the wheels of the tractor. A force sensing cell is provided which is attached to the connecting couple of the tractor and through a control mechanism provides a signal to vary the energy output of the fluid pump corresponding to the magnitude of the load being pulled by the tractor.

---

This invention relates generally to fluid power drives for self-propelled vehicles, such as farm tractors, earth movers, and the like. In more particular aspects, this invention relates to front axle fluid power drives which are synchronized with the rear driving wheels of the vehicle by a variable flow pump equipped with an automatic pressure responsive control.

In still more particular aspects, this invention relates to front axle fluid power drives equipped with a variable flow pump controlled by an automatic pressure responsive controller maintaining driving effort of the fluid drive proportional to the magnitude of the load applied to the tractor.

A front axle fluid power drive employing fluid motors and a variable displacement pump controlled by an automatic pressure responsive controller, which varies the pump displacement to maintain a constant system pressure, will develop a constant torque at the fluid motors. The fluid motors of such a drive, which are mounted on steering wheels and drivingly engaged therewith, will automatically synchronize their driving effort with the mechanical transmission supplying power to the rear driving wheels. The synchronization of such a drive depends, however, upon there being sufficient traction resistance at the front wheels to contain the driving torque developed at the fluid motors. Loss of traction resistance at the front wheels of such a drive will automatically release the full potential energy of the drive within the maximum capacity of the variable flow pump. This situation is further aggravated by the fact that the coefficient of traction resistance diminishes rapidly once the wheels cease to maintain rolling contact with the ground surface and begin to spin. The ground characteristics upon which the tractor must perform work vary widely from one location to another and in some instances may also vary substantially within a comparatively small area of a single field. In order to supply the best tractor performance it is necessary to maintain the driving effort just within the traction resistance of any particular type soil; hence, the torque setting, and therefore, the pressure level setting of the auxiliary fluid drive, which is at the discretion of the operator, becomes critical. When taking into account wide variations of the traction coefficient within a single field, by necessity, the driving effort of the fluid drive in conventional auxiliary fluid drives must be set well below its potential capability. Since, in such a combination of primary mechanical traction drive and synchronized auxiliary fluid power drive both drives contribute to the total useful effort of the vehicle, and since the traction resistance at each of these drives is the limiting factor of the maximum tractor effort, the proportioning of the power developed by these drives becomes vitally important. The maximum driving effort of both primary and auxiliary drives depends not only on the traction coefficient of any particular ground surface but also on the weight transmitted by the wheels of each drive to the ground surface and the line configuration of each drive. Therefore, for optimum performance the power contribution of each drive system to the total driving effort of the tractor should be maintained proportional to the load carried by the wheels of each drive and to some extent to the size of wheels and type of tires of each drive. For maximum possible draw bar pull of the tractor, on any particular type of ground surface with any particular shape and size of tractor tires and weight distribution on the wheels of the primary and auxiliary drive systems, as dictated by the draw bar pull, the driving effort of the tractor should be distributed between primary and auxiliary drives in a fixed proportion.

It is therefore a principal object of this invention to provide an automatic synchronizing control for an auxiliary fluid drive which will maintain a driving effort contribution of the auxiliary and primary drives in an optimum ratio for best overall tractive effort of the tractor.

Another object of this invention is to provide an automatic synchronizing control of an auxiliary fluid drive which will provide a driving effort contribution of auxiliary and primary drives proportional to the weight transmitted by the wheel of these drives to the ground surface.

Still another object of this invention is to provide a control system with adjusting means by which contribution of driving effort between primary and auxiliary drives of vehicles can be varied in respect to each other.

Still another object of this invention is to provide an automatic synchronizing control of a fluid front wheel tractor drive responsive to the total driving effort of this tractor to vary the driving effort of the fluid front wheel tractor drive in proportion to the total driving effort of the tractor.

Further objects and advantages of this invention will become apparent from the following description and drawings in which:

FIGURE 2 is a somewhat schematic representation of fluid drive components of this invention with diagrammatically shown variable displacement pump and pump control components and diagrammatically shown components of load responsive pressure cell mounted on the tractor;

FIGURE 3 is a schematic representation of another embodiment of a variable displacement pump control operated by a load responsive mechanism mounted on the tractor.

Although the invention has broader applications it will be described hereinafter in specific relation to a tractor which presently constitutes the preferred use.

Figure 1:
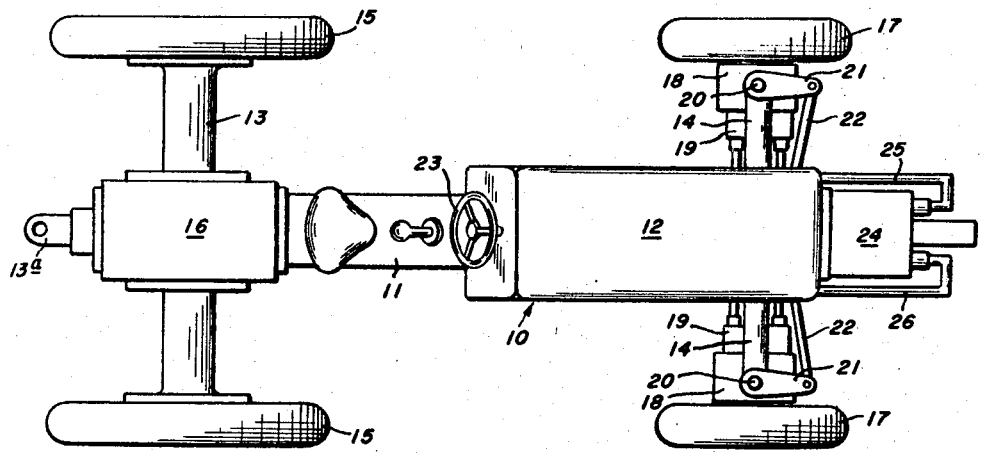
FIGURE 1 is a diagrammatic plan view of a tractor showing the mounting of fluid motors, representative mounting of a fluid pump and mounting of the load responsive fluid drive controls.

Referring now to FIGURE 1 a tractor generally designated as 10 comprises a frame 11 mounting an engine 12, a rear axle 13 and a front axle 14. Rear wheels 15 are mounted on the rear axle 13 and are drivingly connected with the engine 12 by a mechanical transmission 16. Steered front wheels 17 are provided and are equipped with mechanical gear reducers 18 mounting fluid motors 19. The combination of the front steered wheels 17, gear reducers 18 and fluid motors 19 are pivotally mounted by king pins 20 in respect to front axle 14. Conventional steering arms 21 through tie rods 22 connect the front steered wheels 17 to a tractor steering wheel 23. A variable flow pump, generally designated as 24, is driven by the engine 12 and is connected through flexible ducts 25 and 26 to the fluid motors 19. As shown in FIGURE 1, the variable flow pump 24 is directly mounted on the engine although it can be mounted at any suitable power take-off position.

Referring now to FIGURE 2, the variable flow pump 24 is shown with its working components and controls diagrammatically disposed. The rotary motion from the engine 12 is transmitted to cylinder barrel 27 by a shaft 28 which is journalled in housing 29 by bearings 30 and 31. The cylinder barrel 27 is equipped with cylinder bores (not shown) reciprocally guiding pistons 32, which pistons abut reaction surface 33 of a trunnion or cam plate 34. The trunnion 34 is mounted for limited rotation in respect to the pump housing 29 by a trunnion pin 35. The cylinder barrel 27 abuts a valve plate 36 (diagrammatically shown rotated 90° for clarity of explanation), which valve plate has a high pressure timing port 37 and low pressure timing port 38.

The trunnion 34 has an indented part spherical surface 39 engaging one end of a first push rod 40; the other end of the push rod 40 engages a spring guide 41. The spring guide 41 is slidably disposed in a bore 42 provided in the pump housing 29. A control spring 43 is interposed between spring guide 41 and pump housing 29 and through push rod 40 biases the trunnion 34 toward the position of its maximum angular inclination and thus maximum pump output which is the position shown in FIGURE 2.

A control piston 44 is provided which is guided in a control bore 45, provided in the pump housing 29; the piston 44 engages, through a second push rod 46, a second indented part spherical surface 47 on pump trunnion 34. The control bore 45 contains a reaction spring 48, which biases the control piston 44 and push rod 46 toward engagement with trunnion 34.

The high pressure timing port 37 is connected through the flexible duct 25 and ducts 49 and 50 to high pressure ports 51 of motors 19. The low pressure timing port 38 is connected through the flexible duct 26 and ducts 52 and 53 with low pressure ports 54 of fluid motors 19. The flexible duct 25 also conducts pressure fluid from the high pressure timing port 37, through passage 55, to an automatic pressure responsive pump controller, designated generally as 56. The controller 56 is connected through passage 57 with the control bore 45 and through passage 58 with the low pressure flexible duct 26. The pressure responsive pump controller 56 includes first and second bores 59 and 60, slidably guiding, respectively, a control spool 61 and a reaction piston 62. A valve spring 63 is interposed between the control spool 61 and the reaction piston 62. The space 64, enclosed between control spool 61 and reaction piston 62, is connected by drilling 62a to passage 58 which communicates with duct 26. The first bore 59 of the controller 56 is circumscribed by an annular space 65, connected through drilling 65a to passage 57 which communicates with the control bore 45. The control bore 45 is connected through a restrictor orifice 66 with space 67, contained within pump housing 29. Space 68, disposed between the end of the controller housing 69 and the reaction piston 62, is connected through drilling 69a and a duct 70 with a force cell constituting a force sensing means, generally designated as 71, mounted on the mechanical transmission 16 of tractor 10.

The force cell 71 is provided with a first bore 72 and a second bore 73, slidably guiding force piston 74 and force rod 75, respectively. The first bore 72 is filled with a liquid and has disposed therein a force spring 76 normally biasing the force piston 74 toward the position, as shown in FIGURE 2. The force piston 74 is equipped with suitable seals 77. One end of the bore 72 preferably is connected to the atmosphere through vent 78 and the other end is connected to duct 70 through drilling 78a. One side of the piston 74 is in contact with the liquid contained within the bore 72 and with force spring 76. The force rod 75 is suitably connected through a mechanical link 79 with a load, generally designated as 80.

Referring now to FIGURE 3, another embodiment of an automatic pressure responsive pump controller, generally designated as 81, is shown. The controller 81 is connected by passage 55 to the flexible duct 25, communicating with the high pressure timing port 37 and through the duct 58 with the low pressure flexible duct 26, communicating with the low pressure timing port 38. The controller 81 is also connected by passage 57 to the control bore 45 of the variable pump 24. The controller 81 has a housing 82 defining a first bore 83, a second bore 84, a third bore 85 and a fourth bore 86, slidably guiding control spool 87, reaction piston 88, reaction stem 89 and pilot valve spool 90 respectively. An annular ring 91 circumscribes the first bore 83 and is connected to the passage 57 by drilling 91a. Space 92, connected through drilling 92a and passage 58 to flexible duct 26, contains a control spring 93, which acts against reaction piston 88, and, through a spring guide 94 and ball 95 against control spool 87. The pilot valve spool 90 is provided with annular grooves 96 and 97. Annular groove 96 is connected through passages 98 and 99 with space 92. Annular groove 97 communicates through drilling 99a passage 100 with passage 55 and therefore with the high pressure flexible duct 25. An annular ring 101 circumscribes the bore 86 and communicates through passage 102 with space 103, defined by bore 84, reaction piston 88 and reaction stem 89. The pilot valve spool 90 and reaction piston 88 through the reaction stem 89 are connected to a servo beam 104 by pins 105 and 106. One end of the servo beam 104 has drilled therein a series of holes 107 which selectively engage through pin 108 the end of a flexible pull cable 109, guided in a reaction tube 110. The reaction tube 110 is fastened by bracket 111 with suitable bolts to the controller housing 82. The servo beam 104 is biased by a spring 113 through a rod 114 in opposition to the flexible pull cable 109. The flexible pull cable 109 is fastened on its opposite end to a force sensing load piston 115, guided in a bore 116 of a force sensing load cylinder 117. The opposite end of reaction tube 110 is fastened to the load cylinders through a bracket 118. The load piston 115 is equipped with a stem 119, guided in a bore 120, provided in the load cylinder 117. A load spring 121 is interposed between the load piston 115 and the load cylinder 117 and is contained within the space 122 defined by bore 116, which space is vented to the atmosphere by passage 123. The load spring 121 biases the load piston 115 toward engagement with end face 124 of the bore 116. The force cylinder 117 is mounted on the mechanical transmission 16 of the tractor 10. The stem 119 connects the load piston 115 with a pulled load or implement, the force of which is shown aw, driven by the tractor through a suitable linkage not shown.

With respect to the operation of the apparatus hereinabove described and referring to FIGURE 2 the rotary motion from the engine 12 is transmitted by the shaft 28 to the cylinder barrel 27, thereby causing the pistons 32 to reciprocate as they follow the inclined reaction surface 33 of the trunnion 34. This reciprocating motion will induce a pumping action of the fluid within the cylinder barrel 27, which fluid is phased by the high pressure timing port 37 and the low pressure timing port 38 of the valve plate 36. The magnitude of the pressure flow, generated within the cylinder barrel 27, is proportional to the angle of inclination of the reaction surface 33 of the trunnion 34 in respect to the axis of rotation of shaft 28, as is well known in the art. With the reaction surface 33 perpendicular to the axis of rotation of the shaft 28, the pump flow becomes zero; with the maximum angle of inclination, as shown in FIGURE 2, the pump volume output reaches its maximum. Control of fluid flow is accomplished by changing the angle of inclination of the trunnion 34, the angle being regulated by the action of the control spring 43, control piston 44 and automatic pressure responsive pump controller 56. The control spring 43, acting through spring guide 41 and push rod 40, biases the trunnion 34 toward the maximum pump flow position. A pressure signal, supplied from the controller 56 and transmitted through the passage 57 to the control bore 45 will react on the cross-section area of control piston 44, applying force thereto. This force, transmitted to the trunnion 34 by the push rod 46 will tend to overcome the bias of the control spring 45 and rotate the trunnion 34 around trunnion pin 35 toward the position of zero pump displacement.

The automatic pressure responsive controller 56 is arranged to supply a modulated control signal, which will vary the angle of inclination of trunnion 34 and therefore volume output of the pump, to maintain a constant high pressure at a level as dictated by the instantaneous preload in the valve spring 63. The modulation of the automatic pressure responsive control 56 is accomplished in the following manner: Relatively high fluid pressure, conducted from the high pressure timing port 37 through the high pressure flexible duct 25 and passage 55, reacts on the cross-section area of the control spool 61, urging it from right to left as seen in FIGURE 3 against the biasing force of valve spring 63. At any given pressure level as dictated by the preload of the valve spring 63 (and as will be described hereafter more fully), the control spool 61 will move from right to left, connecting annular space 65 with the high pressure fluid. The rising pressure in the annular space 65, transmitted through the passage 57 to the cylinder bore 45, will react on the cross-section area of the control piston 44 moving the piston 44 and therefore rotating the trunnion 34 toward position of smaller pump flow. The reduction in the pump flow caused by the rotation of trunnion 34 will lower the pressure in the timing port 37 and therefore reduce the force acting on the cross-section area of the control spool 61. The biasing force of the valve spring 63 will then move the control spool 61 from left to right isolating annular space 65 from the high pressure fluid. Since the control bore 45 is connected by a restrictor orifice 66 with the low pressure zone 67 within the pump housing 29, a continuous flow of fluid at a small flow level will take place from the cylinder bore 45 through restrictor orifice 66 to low pressure zone 67. Therefore, to maintain a specific pressure level in the control bore 45 a continuous flow of fluid from the annular space 65 must be supplied to the control bore 45, to compensate for the leakage of the restrictor orifice 66. As this leakage occurs the pressure in bore 45 will drop; since the spool 61 blocks ring 65 and drilling 65a the control spring 43 will then turn the trunnion 34 toward the position of largest flow as the pressure in 45 drops due to fluid loss through the restrictor orifice 66. As the flow increases the pressure at the duct 55 increases causing the spool 61 to move and open ring 65 and drilling 65a to bore 45 to thereby admit high pressure fluid to bore 45 and increase the pressure therein. In this way for any specific preload the valve spring 63, the control spool 61, and the trunnion 34 will continually modulate to seek a constant discharge pressure level in the high pressure timing port 37 equivalent to the preload in the valve spring 63. Therefore, for any specific preload in valve spring 63 there will be equivalent pressure level, automatically maintained at high pressure timing port 37.

The preload in the valve spring 63 can be regulated by a change in position of reaction piston 62, in the controller housing 69. The effective preload in the valve spring 63 is provided in part by the introduction of pressure fluid from duct 70 into space 68. This pressure fluid reacting on the cross-section area of the reaction piston 62 will maintain a preload in the valve spring 63 proportional to the magnitude of the pressure signal in the space 68. (It should be noted that the space 64, within the controller body 69, is connected to low pressure timing port 38 through passages 58 and low pressure flexible duct 26 and thus is a constant pressure.)

As described above, a variation in the pressure signal in the duct 70 will be automatically translated into an equivalent pressure in the high pressure timing port 37 and therefore into an equivalent pressure at the high pressure ports 51 of the fluid motors 19. A pressure signal proportional to load W representing the pull of the tractor is generated within the first bore 72 of the force cell 71. The first bore 72 is filled with a liquid which under the action of the force W generates a pressure which reacting on the effective area of force piston 74 will balance it completely. Since liquids are relatively non-compressible the force piston 74 and force rod 75 will be subjected to very small relative movements in respect to the first bore 72. The force spring 76 is provided to maintain the force piston 74, in a position as shown in FIGURE 2, in the absence of the force W. For filling purposes, the first bore 72 may be connected through a check valve to a small liquid reservoir for replenishment of liquid in case of leakage and at the same time the bore 72 may be connected to this liquid reservoir by a thermal relief valve, which would compensate for the pressures generated in the liquid by raising temperature of the force cell 71.

Since the pressure in the liquid in the first bore 72 of the force cell 71 is always proportional to the load W, which represents the total useful tractive effort of the tractor, this pressure transmitted through duct 70 will, in a manner as described above, automatically be translated into the equivalent pressure in the high pressure timing port 37 of the variable pump 24 and therefore into the equivalent driving effort transmitted from fluid motors 19 to the tractor front wheel drive 17. Therefore any change in magnitude of the load W will be automatically translated into equivalent change in the driving effort at the tractor front wheels 17. Since the load W under condition of driving equilibrium is always balanced by the sum of the tractive efforts, developed by the primary mechanical drive at the rear wheels 15 and the traction effort developed by the auxiliary fluid drive at the front wheels 17, by maintaining automatically a proportional relationship between load W and tractive effort developed by the auxiliary fluid drive, a relationship between the tractive efforts of primary and auxiliary drives will also be maintained. For maximum traction efficiency of the vehicle, under conditions of all possible variations in the ground surface coefficient, the relationship between the tractive efforts, developed by primary and auxiliary drives, must be maintained approximately in relation to the loads transmitted to the ground surface by the wheels of the primary and auxiliary drives. This tractive effort relationship between the primary and auxiliary drives, for optimum vehicle tractive effort, may be further modified by the factors relating to size and shape of the tires being used on the front and back wheels of the tractor. Therefore, using this type of automatic control the best possible selected relationship between the magnitude of the driving efforts of the primary and auxiliary power drives can be selected to obtain the optimum traction efficiency of the vehicle.

In FIGURE 3, an automatic control system equivalent in its performance to that as described when referring to FIGURE 2 is shown, but with the control signal instead of hydraulically being transmitted through flexible pull cable arrangement. In this embodiment force is translated into a proportional linear displacement signal which signal is transmitted to the pump displacement control. Instead of generation of pressure signal in the force cell 71 of FIGURE 2 a mechanical displacement of stem 119, against the bias of the load spring 121, proportional to load W, is generated. In a well known manner the displacement of the stem 119 is transmitted through flexible pull cable 109 to the servo beam 104. An increase in force W and corresponding displacement of stem 119 will rotate servo beam 104 around pivot 106, moving pilot valve spool 90 to the left. Annular space 97, connected to the high pressure timing port 37 (shown in FIGURE 2), through passage 100, passage 55 and high pressure flexible line 25 will be connected to annular ring 101 and therefore through passage 102 to space 103. The rising pressure in space 103, reacting on the effective area of reaction piston 88 will move it from left to right, changing the preload in the control spring 93. This movement of the reaction piston 88, through reaction stem 89 and pivot 106, will rotate the servo beam 104 around pivot 108, moving the pilot valve spool from left to right to the position as shown in FIGURE 3. The system will then remain in equilibrium, maintaining preload in the control spring 93, proportional to displacement of stem 119 and therefore proportional to the force W. Conversely a reduction in force W under action of load spring 121 will move stem 119 from left to right, causing corresponding rotation of servo beam 104 around pivot 106, effectively moving pilot valve spool 90 from left to right. The annular ring 101 will then become connected to annular groove 96, thus effectively connecting space 103 through passage 102, annular ring 101, annular groove 96, passage 98, passage 99 and passage 58 to the low pressure flexible duct and therefore to the low pressure port 38 of the variable pump 34. Under the action of the control spring 93, the reaction piston 88, the reaction stem 89 and pivot 106 will move from right to left, effectively rotating the servo beam 104 around pivot 108 and effectively moving pilot valve spool 90 from right to left to the position as shown in FIGURE 3. Therefore, in this way, through the above described mechanism, a change in the force W will be automatically translated into the proportional equivalent preload of the control spring 93. Since as described in detail, when referring to FIGURE 2, the discharge pressure at the high pressure timing port 37 will automatically be maintained proportional to the preload in the control spring 93, the load W, through the action of fluid motors 19 will regulate in a proportional way the driving effort developed at the tractor's front wheels 17. It should be noted that the action of the control spool 87 is identical to that of control spool 61 of FIGURE 2. The control system as shown in FIGURE 3, although basically equivalent to that shown in FIGURE 2, offers some additional advantages. By changing the hole 107 in which the pin 108 is inserted, the ratio of the control mechanism can be effectively changed, while still maintaining the proportionality of the control system. For example, when attaching flexible pull cable 109 to one of the lower holes 107, the movement of stem 119 will still produce a proportional change in preload in the control spring 93, but at a lower ratio. This lower ratio is defined as ratio between movement of reaction piston 88 and stem 119. Conversely, when engaging the flexible pull cable with one of the higher holes 107, a higher ratio of the mechanism can be obtained. In this way, a relationship between tractive efforts developed by the primary and auxiliary drives can be regulated. The ability to adjust the ratio of the tractive efforts, developed by the primary and auxiliary drives, becomes especially important when the basic redistribution of weight, either due to mounting the wheel weights or different implements is contemplated.

Figure 4:
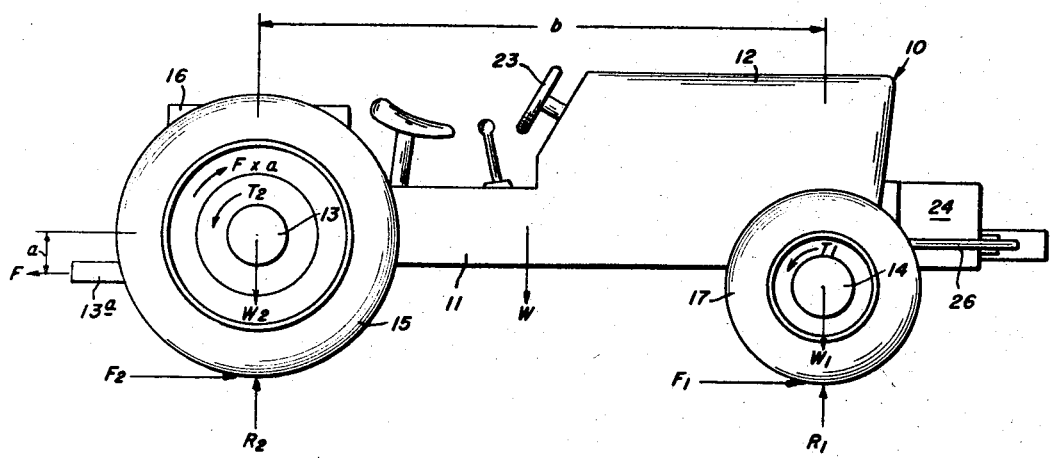
FIGURE 4 is a diagrammatic side view of a tractor showing weight distribution in respect to the ground surface and relationship between tractor pulling forces and the ground reaction.

Referring now to FIGURE 4, the various force components acting on the tractor are shown. The total weight of the tractor is represented by force vector W passing through the center of gravity of the tractor. The portion of the weight of the tractor carried by the front wheels 17 in a static condition is represented by the force vector $W_1$. Another portion of the weight of the tractor carried by the rear wheels 15 in a static condition is represented by the force vector $W_2$. Ground reaction to the weight of the tractor transmitted by the front wheels 17 and the rear wheels 15 when pulling load F is represented by force vectors $R_1$ and $R_2$ respectively. Maximum tractive effort within the available traction coefficient transmitted by the front wheels 17 and the rear wheels 15 is represented by force vector $F_1$ and $F_2$ respectively. Force vector F represents force of pulling a load. The linear distance between front axle 14 and rear axle 13 is represented by $b$ and the normal distance between line of action of force vector F and center of axle 13 is represented by $a$. Where the vectors $F_1$, $F_2$ represent maximum possible traction force for any particular driving surface and soil structure it can be seen that the magnitude of the force vector F will to some degree affect the magnitudes of soil reactions $R_1$ and $R_2$ and therefore relative magnitude of vectors $F_1$ and $F_2$. The magnitude of this change will depend upon basic geometric parameters of the tractor which are established by distances $b$ and $a$ and actual value and position of force W. With vector F representing the useful pull of a tractor, when pulling a load a turning moment, equal to the product of $F_{xa}$, is applied to the frame of the tractor, tending to increase actual value of $R_1$ and decrease value $R_2$. Since the value of $b$ is normally many times larger than value of "$a$" the change in the $R_1$ value due to force F is comparatively small.

While pulling a load F while developing driving torque at the rear and front wheels of the tractor, the torque $T_2$ developed at the rear wheels will apply a couple to the tractor frame 10 tending to reduce value of soil reaction $R_1$ and increase value of soil reaction $R_2$. The torque developed at the front wheels of the tractor $T_1$ will again tend to rotate the tractor frame 11 further decreasing the value of $R_1$ and increasing the value of $R_2$. The influence of the torques $T_2$ and $T_1$ on $R_1$ and $R_2$ are additive. With an increase of draw bar pull due to the reaction on tractor frame 11 of torques $T_1$ and $T_2$ the value of $R_1$ will decrease and the value of $R_2$ will increase. For any specific ground surface condition and tractor tire configuration the value of $T_1$ should be selected in respect to the maximum draw bar pull for optimum traction performance. If, however, the nature of the pull behind load, represented by vector F is changed and when tractor pulls a tool mounted on well known three point hitch, the moments, transmitted from the tool to the tractor frame, may be comparatively large, thus substantially effecting relative magnitudes of ground reaction forces $R_1$ and $R_2$, with $R_1$ always becoming smaller and $R_2$ becoming larger. With such a type of load the usefulness of the front wheel auxiliary drive may become questionable, since most of the driving effort would have to be developed at the tractor rear wheels. However, even in such a case the above control system would show a definite advantage, although the linear motion of flexible pull cable may have to be transmitted to the servo beam through a conventional non-linear cam arrangement. The spring 113 and rod 114 may be included to prevent transmission of compressive load through flexible pull cable.

Although several embodiments of this invention have been shown and described, various adaptations and modifications can be made without departing from the scope of the appended claims.

What is claimed is:

1. In a self-propelled vehicle for pulling a load including means for interconnecting said vehicle to said load and wherein said vehicle includes a frame with driving wheels connected thereto, an engine, a mechanical transmission interposed between said engine and said driving wheels, and at least one steered wheel means pivotally mounted in respect to said frame; the combination thereof with of a fluid power transmission and control system interposed between said engine and said steered wheel means, said system including fluid motor means drivingly connected to said steered wheel means, a variable flow pump disposed to supply pressure fluid to said motor means, means to vary the fluid pressure supplied by said variable pump, force sensing means adapted to sense force between said vehicle and said load, means responsive to said force sensing means and operably connected to said means to vary the fluid pressure and disposed to operate said means to vary said fluid pressure in response to a change in the load, whereby pressure of fluid supplied by said variable pump will vary in respect to magnitude of said driven load.

2. The combination of claim 1 wherein said means to vary the fluid pressure supplied by said variable flow pump includes fluid pressure responsive control means.

3. The combination of claim 2 wherein said means responsive to said force sensing means includes means to translate a force change into a fluid pressure signal.

4. The combination of claim 3 wherein said means to translate force change to a fluid pressure signal includes valving means to phase pressure fluid to said fluid pressure responsive control means.

5. The combination of claim 2 wherein said fluid pressure responsive control means includes piston means disposed in a bore, and duct means connected between said bore and said means to translate a force change into a fluid pressure signal to supply pressure fluid to said bore.

6. The combination of claim 5 wherein said pump is an axial piston pump and has flow changing means which includes tiltable cam plate means, and wherein said piston means is operable against said cam plate means.

7. The combination of claim 6 wherein said flow changing means includes spring biasing means operable in opposition to said piston means normally urging said cam plate means toward a position of maximum displacement.

8. In a self-propelled vehicle for pulling a load including means for interconnecting said vehicle to said load and wherein said vehicle includes a frame with driving wheels connected thereto, an engine a mechanical transmission interposed between said engine and said driving wheels, and at least one steered wheel means pivotally mounted in respect to said frame; the combination therewith of fluid power transmission and control system interposed between said engine and said steered wheel means, said system including fluid motor means drivingly connected to said steered wheel means, a variable flow pump disposed to supply pressure fluid to said motor means, said pump including flow changing means, force sensing means disposed to sense force between the vehicle and said load, and control means operably connected to said flow changing means and said force sensing means and disposed to change the flow of the pump proportional to a control signal and responsive to a change in load, whereby said pump discharge pressure will vary proportionally with magnitude of said load.

9. In a self-propelled vehicle for pulling a load including means for interconnecting said vehicle to said load and wherein said vehicle includes a frame with driving wheels connected thereto, an engine, a mechanical transmission interposed between said engine and said driving wheels, and at least one steered wheel means pivotally mounted in respect to said frame; the combination therewith of a fluid power transmission and control system interposed between said engine and said steered wheel means, said system including fluid motor means drivingly connected to said steered wheel means, a variable flow pump disposed to supply pressure fluid to said motor means, said pump including flow changing means, control means operably connected to said flow changing means disposed to operate said flow changing means to maintain pump discharge pressure proportional to a control pressure signal, force sensing means adapted to sense force between said vehicle and said load, and means to translate said force to a control pressure signal and transmit said signal to said control means, whereby said pump discharge pressure will vary proportionally with magnitude of said load.

10. The combination of claim 9 wherein said means to translate force to a pressure signal includes piston means slidably disposed in a bore, and fluid in said bore disposed to absorb a load on said piston and generate said pressure signal.

11. The combination of claim 10 further characterized by spring biasing means operable against said piston means.

12. The combination of claim 11 wherein said spring biasing means is disposed to operate in opposition to increased load on said force sensing means.

13. The combination of claim 9 wherein said control means includes valving means disposed to operate said flow changing means responsive to change in discharge pressure of said pump.

14. The combination of claim 13 wherein said control means includes means to vary the discharge pressure level maintained by the valving means responsive to the pressure signal received from said force sensing means.

15. The combination of claim 14 wherein said valving means includes a pressure fluid inlet, a first piston slidably disposed in a first bore and movable between a first position to permit high pressure fluid flow to said flow changing means and a second position to prevent fluid flow thereto responsive to change in discharge pressure of said pump.

16. The combination of claim 15 wherein said control means includes third piston means disposed in a third bore operable by said fluid pressure signal to operate said flow changing means.

17. The combination of claim 16 wherein said third bore means has duct means connected to provide controlled leakage from said third bore means whereby to provide a modulated control signal.

18. In a self-propelled vehicle for pulling a load including means for interconnecting said vehicle to said load and wherein said vehicle includes a frame with driving wheels connected thereto, an engine, a mechanical transmission interposed between said engine and said driving wheels, and at least one steered wheel means pivotally mounted in respect to said frame; the combination therewith of a fluid power transmission and control system interposed between said engine and said steered wheel means said system including fluid motor means drivingly connected to said steered wheel means, a variable flow pump disposed to supply pressure fluid to said motor means, said pump including flow changing means, control means operably connected to said flow changing means disposed to operate said flow changing means to maintain the pump discharge pressure proportional to a linear displacement control signal force sensing means adapted to sense force between said vehicle and said load, and mechanical means to translate said force into said proportional linear displacement signal and transmit said signal to said control means, whereby said pump discharge pressure will vary proportionally with change in magnitude of said load.

19. The combination of claim 18 wherein said control means includes means to translated said linear displacement signal to a fluid pressure signal and means disposed to operate said pump flow changing means responsive to said fluid pressure signal.

20. The combination of claim 19 wherein said means to translate the linear displacement signal to a fluid pressure signal includes valve spool means guided in valve bore means, means to operate said spool means responsive to said linear signal, and duct means disposed to transmit said pressure signal responsive to movement of said spool means.

21. The combination of claim 20 further characterized by said means to operate said spool means including beam means.

22. The combination of claim 21 further characterized by said mechanical means to translate force to a linear displacement signal including cable means operable by said force sensing means and operably connected to said beam means.

23. The combination of claim 21 wherein said beam means is pivotally mounted intermediate its ends on pressure responsive input means, and said valve spool means is operably connected to one end of said beam means and movable thereby, duct means disposed to selectively transmit pressure fluid to said pressure responsive input means in response to movement of said valve spool, and said mechanical means to translate and transmit said linear displacement signal being operably connected to the opposite end of said beam means.

24. The combination of claim 23 further characterized by said pressure responsibe input means including first and second piston means slidably disposed in bore means, and spring biasing means interposed between said first and second piston means.

25. The combination of claim 24 further characerized by said first piston means having means responsive to pressure fluid transmitted by said valve spool, and said second piston means having means responsive to the pressure generated by the pump and disposed to transmit an input to said spring biasing means in response to the discharge pressure of the pump, whereby said second piston means will translate the linear signal from said mechanical means through the action of the beam means to a fluid pressure control signal to the flow changing means to vary the discharge pressure in response to the force level of said load.

26. The combination of the claim 25 further characterized by said operable connection of said beam means and said mechanical means including means to adjust the mechanical advantage ratio of said beam means whereby the sensitivity of the control can be adjusted.

27. In a self-propelled vehicle for pulling a load, including means for interconnecting said vehicle to said load and wherein said vehicle includes a frame with driving wheels connected thereto, an engine, a mechanical transmission interposed between said engine and said driving wheels and at least one steered wheel means pivotedly mounted in respect to said frame; the combination therewith of a fluid power transmission and control system interposed between said engine and said steering wheel means, said system including fluid motor means drivingly connected with said steered wheel means, a variable flow pump disposed to supply fluid energy to said motor means, means to vary the fluid energy supplied by said pump, force sensing means adapted to sense force between said vehicle and said load and provide a signal corresponding to the magnitude of the load, and control means adapted to operate said means to vary the fluid entry of said pump in response to the magnitude of said signal from said force sensing means, whereby the fluid entry will vary in respect to the magnitude of the driven load.

References Cited

UNITED STATES PATENTS

| | | | |
|---|---|---|---|
| 1,267,742 | 5/1918 | Bulley | 180—14 |
| 3,053,043 | 9/1962 | Knowler | 60—52 |
| 3,234,726 | 2/1966 | Hann | 60—52 |
| 3,272,277 | 9/1966 | Budzich | 180—44 |

A. HARRY LEVY, *Primary Examiner.*